US012601327B2

(12) United States Patent
Jewett et al.

(10) Patent No.: US 12,601,327 B2
(45) Date of Patent: Apr. 14, 2026

(54) DIRECT AIR CAPTURE USING GEOTHERMAL COOLING TOWERS

(71) Applicant: Fervo Energy Company, Houston, TX (US)

(72) Inventors: Sarah Jewett, Houston, TX (US); Jack Norbeck, Golden, CO (US); Timothy Latimer, Houston, TX (US); Katharine Voller, McKees Rocks, PA (US)

(73) Assignee: Fervo Energy Company, Houston, TX (US)

( * ) Notice: Subject to any disclaimer, the term of this patent is extended or adjusted under 35 U.S.C. 154(b) by 715 days.

(21) Appl. No.: 17/953,720

(22) Filed: Sep. 27, 2022

(65) Prior Publication Data

US 2023/0102252 A1     Mar. 30, 2023

Related U.S. Application Data

(60) Provisional application No. 63/249,476, filed on Sep. 28, 2021.

(51) Int. Cl.
*F03G 4/00*     (2006.01)
*B01D 53/14*     (2006.01)
     (Continued)

(52) U.S. Cl.
CPC .......... *F03G 4/001* (2021.08); *B01D 53/1475* (2013.01); *B01D 53/343* (2013.01);
     (Continued)

(58) Field of Classification Search
CPC ..... F03G 4/001; F03G 4/026; B01D 53/1475; B01D 53/343; B01D 53/62;
     (Continued)

(56) References Cited

U.S. PATENT DOCUMENTS

| | | | | |
|---|---|---|---|---|
| 10,577,248 B2 * | 3/2020 | Harper, Jr. | ................ | C02F 9/00 |
| 2018/0345207 A1 * | 12/2018 | Custelcean | ........ | B01D 53/1475 |

FOREIGN PATENT DOCUMENTS

| | | | | |
|---|---|---|---|---|
| WO | 2018160888 | 9/2018 | | |
| WO | WO-2018160888 A1 * | 9/2018 | ........ | B01D 53/1425 |
| WO | 2023055713 | 4/2023 | | |

OTHER PUBLICATIONS

"International Application Serial No. PCT US2022 044832, International Search Report mailed Jan. 10, 2023", 3 pgs.

(Continued)

*Primary Examiner* — Daniel C. Mccracken
*Assistant Examiner* — Starfari Teshawn Mcclain
(74) *Attorney, Agent, or Firm* — Schwegman Lundberg & Woessner, P.A.

(57) ABSTRACT

Systems and techniques may be used for incorporating direct air carbon dioxide capture capabilities into a working fluid condensing process of a geothermal power plant. An example technique may include causing, using fans, air to flow across condenser coils of a condensing unit, through which power cycle working fluid is circulated, and through a direct air capture (DAC) filtration component, which separates carbon from the air, capturing heat from a geothermal working fluid, and using the heat as thermal energy input to the DAC filtration component or using electrical energy generated from the geothermal power plant as electrical energy input to power the condensing unit and the DAC filtration component. The example technique may include gathering the carbon separated from the air to be injected into a geothermal reservoir or repurposed for another industrial process.

20 Claims, 5 Drawing Sheets

(51) Int. Cl.
    *B01D 53/34*       (2006.01)
    *B01D 53/62*       (2006.01)

(52) U.S. Cl.
    CPC ........ *B01D 53/62* (2013.01); *B01D 2257/504*
         (2013.01); *B01D 2259/655* (2013.01)

(58) Field of Classification Search
    CPC ........ B01D 2257/504; B01D 2259/655; B01D
         2259/657; B01D 53/04; Y02C 20/40;
               Y02E 10/10
    See application file for complete search history.

(56)               References Cited

OTHER PUBLICATIONS

"International Application Serial No. PCT US2022 044832, Written Opinion mailed Jan. 10, 2023", 6 pgs.

"International Application Serial No. PCT US2022 044832, International Preliminary Report on Patentability mailed Apr. 11, 2024", 8 pgs.

Ben-Mansour, R., "Carbon capture by physical adsorption, Materials, experimental investigations and numerical modeling and simulations—A review", Applied Energy 161, (2016), 225-255.

Masson-Delmotte, V. (Ed.), "IPCC, 2021: Summary for Policymakers. In: Climate Change 2021: The Physical Science Basis. Contribution of Working Group I to the Sixth Assessment Report of the Intergovernmental Panel on Climate Change", Cambridge University Press, Cambridge, United Kingdom and NewYork, NY, USA, (2021), 32 pgs.

McQueen, Noah, "A review of direct air capture (DAC): scaling up commercial technologies and innovating for the future", Progress in Energy 3, 032001, (2021), 23 pgs.

McQueen, Noah, "Natural Gas vs. Electricity for Solvent-Based Direct Air Capture", Frontiers in Climate, 2(618644), (Jan. 2021), 17 pgs.

"Arctic Fox: Climeworks first direct air capture plant", Climeworks, XP093340003, [Online] Retrieved from the internet: <https://climewcirks.com/plant-arctic-fox>, (Jan. 1, 2017), 9 pgs.

"European Application Serial No. 22877198.6, Extended European Search Report mailed Dec. 9, 25", 7 pgs.

Proctor, Darrell, "Test of Carbon Capture Technology Underway at Iceland Geothermal Plant", [Online] Retrieved from the internet: <https ://www.potwermag.com/test-of-carbon-capture-technolocjy-underway-at-iceland-geothermal-plant/>, (Dec. 1, 2017), 10 pgs.

* cited by examiner

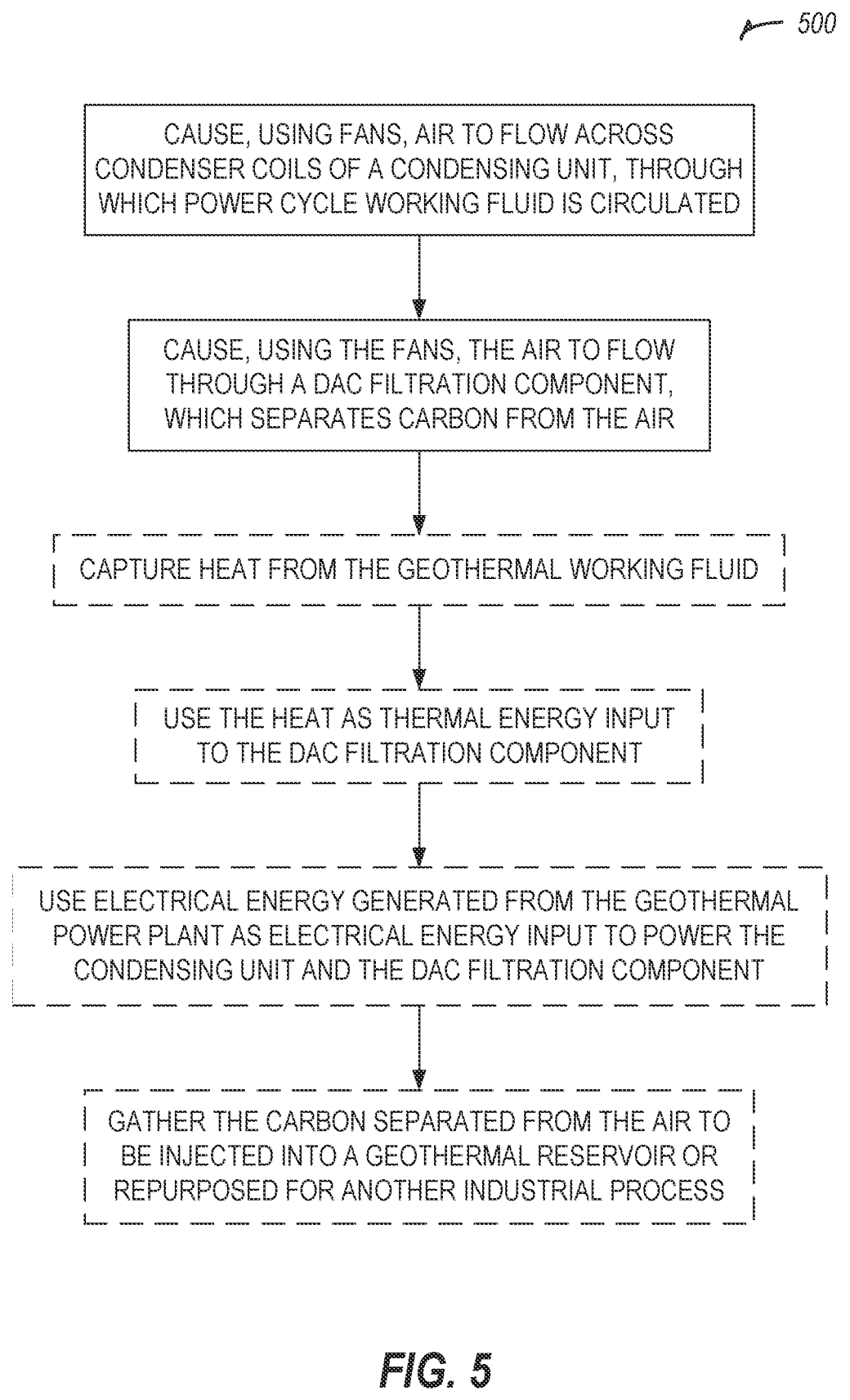

500

CAUSE, USING FANS, AIR TO FLOW ACROSS
CONDENSER COILS OF A CONDENSING UNIT, THROUGH
WHICH POWER CYCLE WORKING FLUID IS CIRCULATED

CAUSE, USING THE FANS, THE AIR TO FLOW
THROUGH A DAC FILTRATION COMPONENT,
WHICH SEPARATES CARBON FROM THE AIR

CAPTURE HEAT FROM THE GEOTHERMAL WORKING FLUID

USE THE HEAT AS THERMAL ENERGY INPUT
TO THE DAC FILTRATION COMPONENT

USE ELECTRICAL ENERGY GENERATED FROM THE GEOTHERMAL
POWER PLANT AS ELECTRICAL ENERGY INPUT TO POWER THE
CONDENSING UNIT AND THE DAC FILTRATION COMPONENT

GATHER THE CARBON SEPARATED FROM THE AIR TO
BE INJECTED INTO A GEOTHERMAL RESERVOIR OR
REPURPOSED FOR ANOTHER INDUSTRIAL PROCESS

FIG. 5

DIRECT AIR CAPTURE USING GEOTHERMAL COOLING TOWERS

PRIORITY CLAIM

This application claims the benefit of U.S. Provisional Application No. 63/249,476, filed on Sep. 28, 2021, which is hereby incorporated by reference in its entirety.

TECHNICAL FIELD

Embodiments pertain to geothermal power plant design, maintenance, or operations, and direct air capture (DAC) for carbon dioxide removal from the atmosphere. Some embodiments relate to rejecting heat from the working fluid of a geothermal power plant and capturing carbon dioxide (CO2) from ambient air.

BACKGROUND

Geothermal energy systems typically use an injection well to introduce a cool injection fluid from the surface into a geothermal energy reservoir thousands of feet below ground. The geothermal energy reservoir is a formation such as a heated rock formation. As the injected fluid travels through the geothermal reservoir, the fluid absorbs heat increasing its temperature or enthalpy. One or more production wells are also disposed in the formation and are offset from the injection well so that the heated fluid may be pumped up from the formation to the surface where the heat may be extracted from the heated fluid to provide useable energy, often in the form of electricity. For example, a generator such as a steam turbine, Organic Rankine Cycle turbine, or other turbine may be used to convert the thermal energy entrained in the geothermal fluid into electricity. When geothermal power is generated using an Organic Rankine Cycle power plant, geothermal is a clean, renewable, zero-emission energy source.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates a flowchart showing a technique for incorporating direct air carbon capture capabilities into a working fluid condensing process of a geothermal power plant in accordance with some examples.

DETAILED DESCRIPTION

Figure 1:
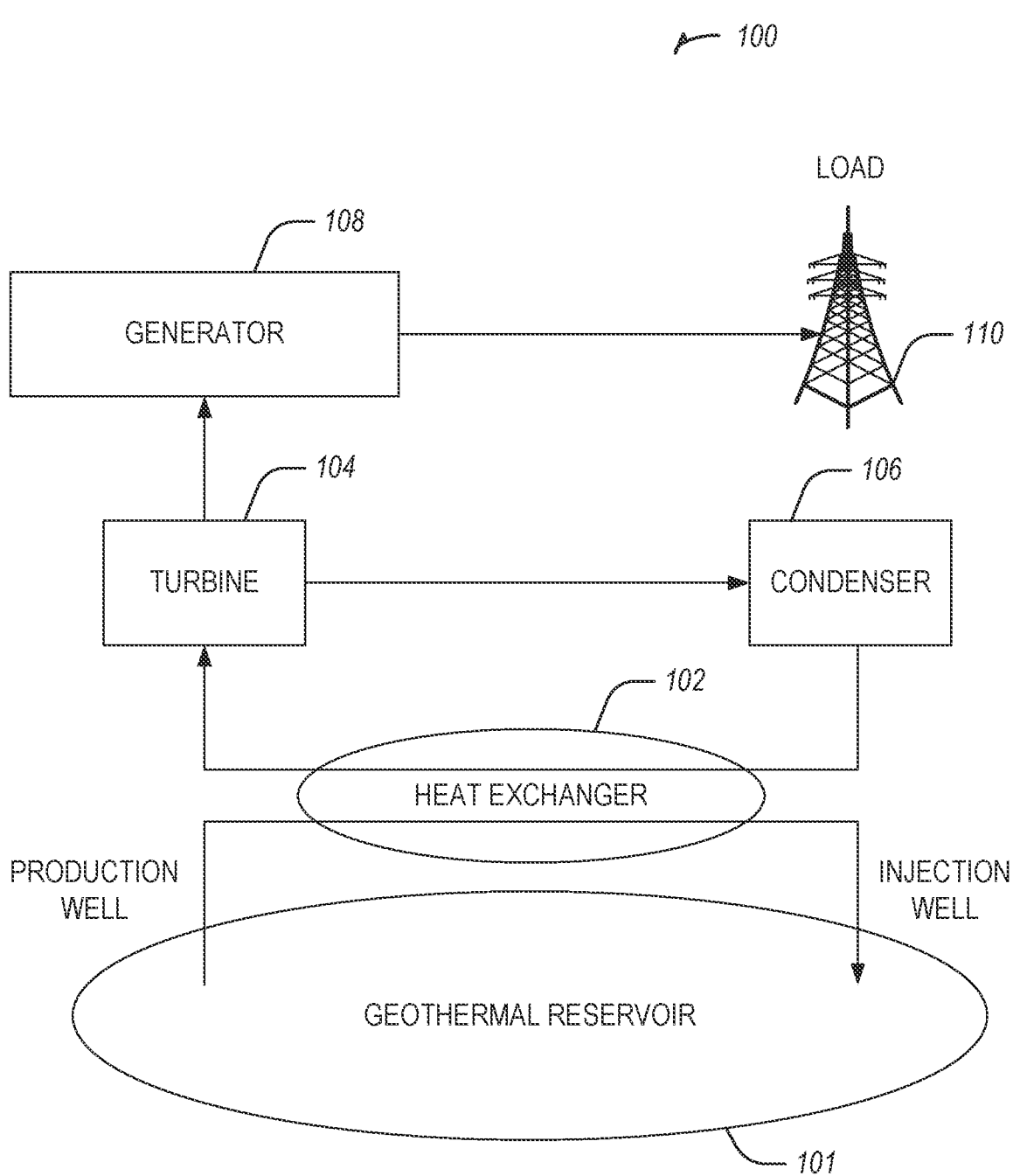
FIG. 1 illustrates a binary cycle power plant in accordance with some examples.

Devices are used to reject heat from the working fluid of a geothermal power plant. Binary cycle geothermal power plants utilize a closed thermodynamic cycle wherein the working fluid receives heat from the geofluid, evaporates, expands through a turbine to produce electricity, and is then condensed and returned to an evaporator by means of a feed pump. As part of the condensing process, heat must be rejected from the working fluid to a cooling medium, typically either air or water. Typical air-cooled condensers utilize a plurality of cooling fans capable of passing a large volume of air over the working fluid circulating through condenser coils above or below the fans. Typical hybrid, or deluge, cooling systems utilize low amounts of water with air-cooled systems to improve performance of a binary geothermal plant by modifying a condenser section to incorporate evaporative cooling. Both types of condensers are often mounted on structural steel trusses in order to allow sufficient air flow circulation.

Binary geothermal power plants with air-cooled or hybrid condensers provide a wide range of benefits, including zero carbon emissions, zero air pollutants, minimal water requirements, and low surface land use compared to other renewable energy sources. However, these condensers may have a large footprint compared to the other components that make up the power plant, and their construction and maintenance make up a large fraction of the overall geothermal power station capital costs and operating costs. Because heat rejection systems require a multitude of fans and supporting structures, materials to construct the system are costly. In addition, the condensers require electricity for operation, increasing the parasitic load of a geothermal power plant and reducing revenue.

DAC devices are used to remove CO2 from the air. These devices use large air contact arrays to pull ambient air across a filter equipped with a chemical media or sorbent that serves to separate CO2 from the air. CO2 is separated using chemical solutions, solid sorbents, or other tactics such as cryogenic processes or micro-algal bio fixation. As opposed to direct-source carbon capture devices that are typically co-located with fossil fuel combustion processes, DAC processes typically target atmospheric air and are location-independent.

Air contact arrays used for DAC also have a large footprint and are highly capital-intensive for many of the same reasons as geothermal air-cooled and hybrid condensers. Because CO2 exists at relatively low concentrations in the atmosphere, large volumes of air must be passed through the filters to capture any appreciable amount of CO2 molecules. There is substantial capital expenditure associated with manufacturing and constructing the fans used to draw in ambient air. Additionally, air contact arrays require both thermal energy and electricity for operation, that are both expensive if not readily available. If the electricity or process heat used in the DAC process is not derived from clean, renewable, or carbon free sources, then the net carbon removal from the atmosphere may be greatly diminished or even negated entirely.

In some cases, heat entrained in geothermal fluid is used directly for industrial applications or other applications where process heat is required.

The systems and techniques described herein relate to geothermal power plant design, maintenance, or operations and to direct air capture (DAC) for carbon dioxide removal from the atmosphere. The systems and techniques reject heat from the working fluid of an Organic Rankine Cycle (or binary cycle) geothermal power plant and capture carbon dioxide (CO2) directly from ambient air, condense the CO2 into a more concentrated stream, reuse the CO2, or store the CO2 in a geothermal reservoir. In some examples, energy recovered from the geothermal reservoir may be used both to power the combined system and as a heat source in the DAC process.

Binary cycle geothermal power plants are equipped with sizeable cooling towers that circulate large quantities of air or water in order to reject heat from the plant's working fluid after it is vaporized. DAC technologies use sizeable air contact arrays to capture $CO_2$ from the air such that the compounds may be used or stored. These carbon capture devices often require substantial amounts of heat to drive the regeneration process as well as electricity to drive the fans and other auxiliary equipment. The systems and techniques described herein combine components of geothermal air-cooled or hybrid (e.g., air- and water-cooled) condensers and DAC contact arrays to condense a geothermal plant's working fluid and capture $CO_2$. The systems and techniques described herein may use energy recovered from the geothermal resource to power the DAC system or as a source of thermal energy for various processes involved in operating the DAC system.

The systems and techniques described herein address one of the biggest problems of this generation, climate change. There is widespread agreement that observed increases in greenhouse gas (GHG) concentrations are unequivocally caused by human activities and that limiting human-induced global warming to a specific level requires limiting cumulative $CO_2$ emissions. The systems and techniques described herein provide a powerful two-fold approach to solving that problem, by combining geothermal energy, a zero-emissions source of electricity, with DAC, a negative emissions technology, thereby optimizing synergies between the two and maximizing capital efficiency.

To capture large amounts of $CO_2$, a large volume of air is filtered through a DAC system, which may be done using a multitude of fans. In a geothermal power plant, industrial scale fans are used to move large volumes of air through the system. The systems and techniques described herein integrate the direct air capture filtration process directly into the cooling tower process.

One aspect of a combined system that allows for improved outcomes (e.g., reduced power usage, reduced waste, etc.) is that the overall energy required for a DAC process includes both electric input and heat input, to eject $CO_2$ from the filter. The geothermal system has a low-grade waste heat (e.g., after fluid is sent through the power plant), which may be used to power the air capture filtration.

In a geothermal power plant, a cooling tower unit may be located on-site of the power facility near the downstream end of the turbine. After the power cycle working fluid passes through a turbine, the working fluid must be condensed back into a liquid phase. The cooling tower acts to remove a sufficient amount of energy from the working fluid to condense it. Cooling tower units are commonly referred to as evaporative cooling systems, air-cooled systems, water-cooled systems, or hybrid systems depending on their design and functionality.

In an example binary cycle geothermal power plant, there are multiple heat exchange systems that serve to transfer energy from one medium to another to maximize the overall thermodynamic efficiency of the power facility. A first heat exchanger is effectively the geothermal reservoir itself. One of more injection wells disposed in the geothermal formation is used to pump geothermal fluid into the geothermal reservoir. The geothermal fluid may be water, brine, $CO_2$, or some mixture of fluids. Fractures and pores in the subsurface provide contact area with the hot subsurface formation, allowing the geothermal fluid to recover heat from the formation. One or more production wells disposed in the geothermal formation are used to pump the geothermal fluid back to the surface where it may be used. A second heat exchanger located downstream of the production well or wells acts to transfer heat from the geothermal fluid to another working fluid that is used in the power cycle. The power cycle working fluid may be a refrigerant or an organic compound, or similar fluid with appropriate thermodynamic properties for the power facility's design conditions. The geothermal fluid acts as a heat source which is used to vaporize the power cycle working fluid, which may then be used to power a turbine, which may generate electricity. A third heat exchanger is located at the cooling tower unit, downstream of the turbine, where air or water is passed across a set of condenser coils through which the power cycle working fluid is flowing. Heat from the working fluid is transferred to the air or water, which allows the working fluid to condense. In an example, a DAC system may be located within the cooling tower system to capture $CO_2$ from the air that is also used to reject heat from the power cycle working fluid. The DAC filter may be located before or after the condenser from an air flow perspective, and thus physically located above, behind, below or next to the condenser coils. In an example, additional heat is recovered from the geothermal fluid to provide process heat to the DAC system.

FIG. 1 shows an example of a geothermal well system 100. Here, the well system 100 illustrates a production well that pumps fluid or gas from a geothermal energy source 101 through a heat exchanger 102, to an injection well. In other examples, a dual pump system may be used, such as where the production well and the injection well use separate fluids or gases. The heat exchanger 102 uses the geothermally warmed fluid or gas to heat up a working fluid in a closed loop system. The closed loop system includes a turbine 104 and a condenser 106, The turbine 104 extracts power from the closed loop system (e.g., by converting thermal energy to mechanical or electrical energy). The condenser 106 extracts heat from the working fluid within the closed loop system. A generator 108 may use energy generated by the turbine 104 to send to a load 110 (e.g., to power a grid).

The generator 108 may include an Organic Rankine Cycle turbine, screw expander turbine, other turbine, or other electricity generator. The electricity may be transferred to the grid (e.g., load 110) for distribution. The energy created by the turbine 104 or the generator 108 (which may in some examples, convert mechanical energy to electrical energy) may be used to power a DAC system. The heat extracted by the condenser 106 may be used to apply heat within the DAC systems A similar geothermal power system may involve passing the geothermal fluid directly through the turbine without a heat exchanger, such as with a steam turbine or screw expander turbine.

Figure 2:
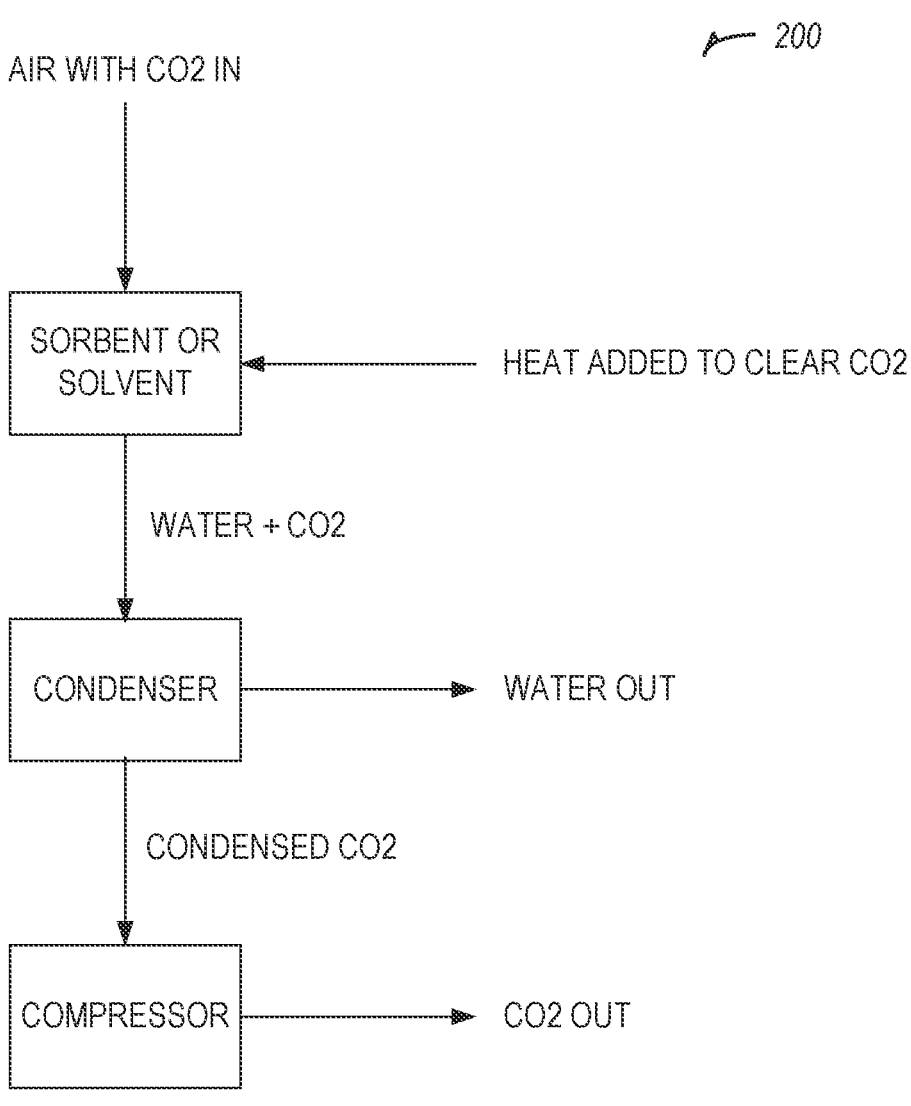
FIG. 2 illustrates a process flow diagram for direct air capture (DAC) in accordance with some examples.

FIG. 2 illustrates a process flow diagram 200 for direct air capture (DAC) in accordance with some examples. DAC removes $CO_2$ from ambient or atmospheric air. There are two main types of DAC, a liquid solvent DAC and a solid sorbent DAC. In either example, the solvent or the sorbent reacts with flowing air to remove $CO_2$ from the air. The resulting $CO_2$ may be condensed at a condenser (e.g., using water). The condensed. $CO_2$ may be sent to a compressor for further processing. The $CO_2$ may be converted into a solid through a chemical reaction.

In a liquid solvent carbon capture, air is sucked in and liquid solvent is run through a structure, such as in a continuous process. In a solid sorbent carbon capture, air may be run through a discrete filter. In the solid sorbent example, the air fan may open, the CO2 may reach a specified level of concentration, and then the air fan may be shut. When shut, the CO2 is rejected from the filter (using one of various techniques), then the fan is reopened, which is a stop and go process. FIG. 2 shows that heat may be added to the sorbent or solvent filter to remove the CO2.

Figure 3:
FIG. 3 illustrates a condenser and DAC system in accordance with some examples.
Figure 3:
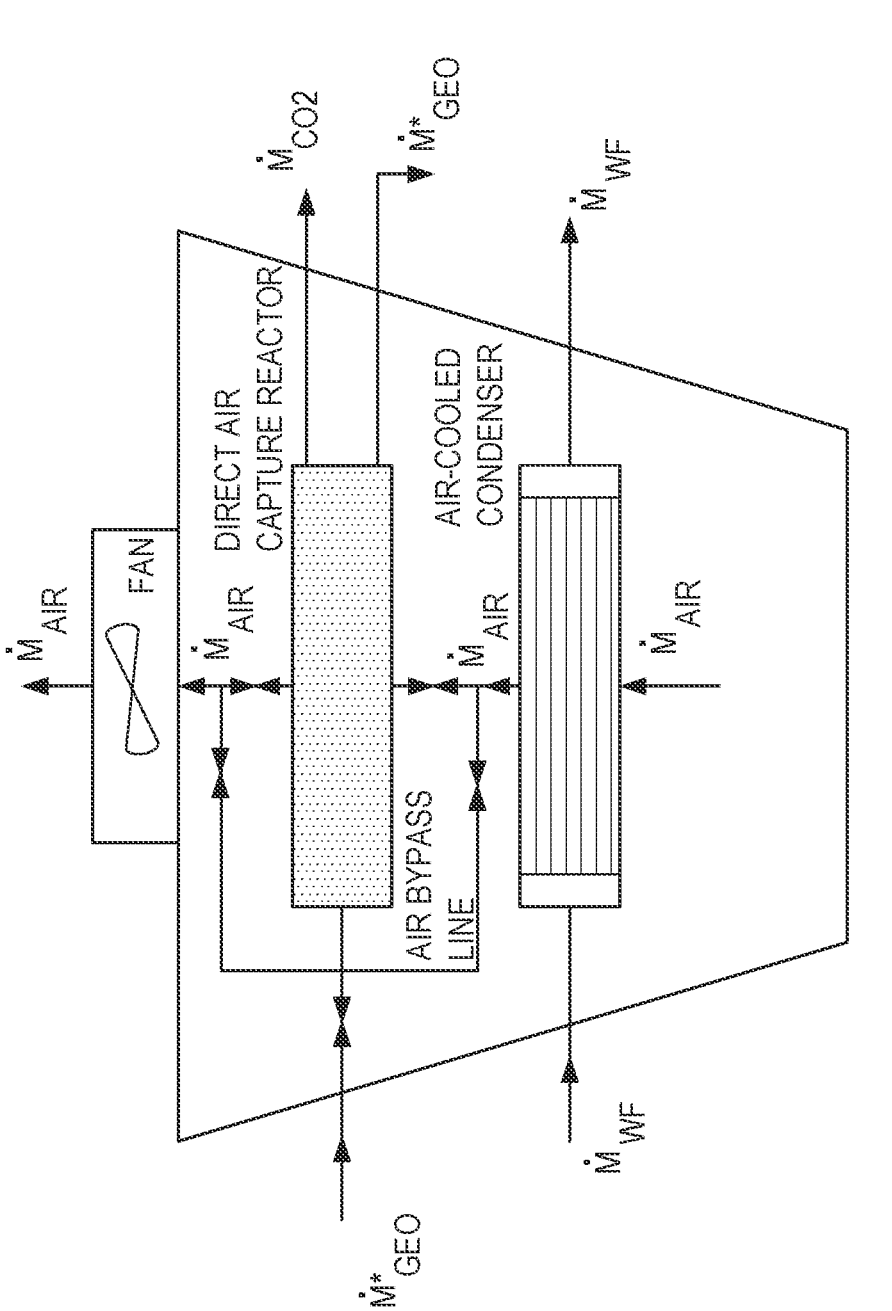
Figure 4:
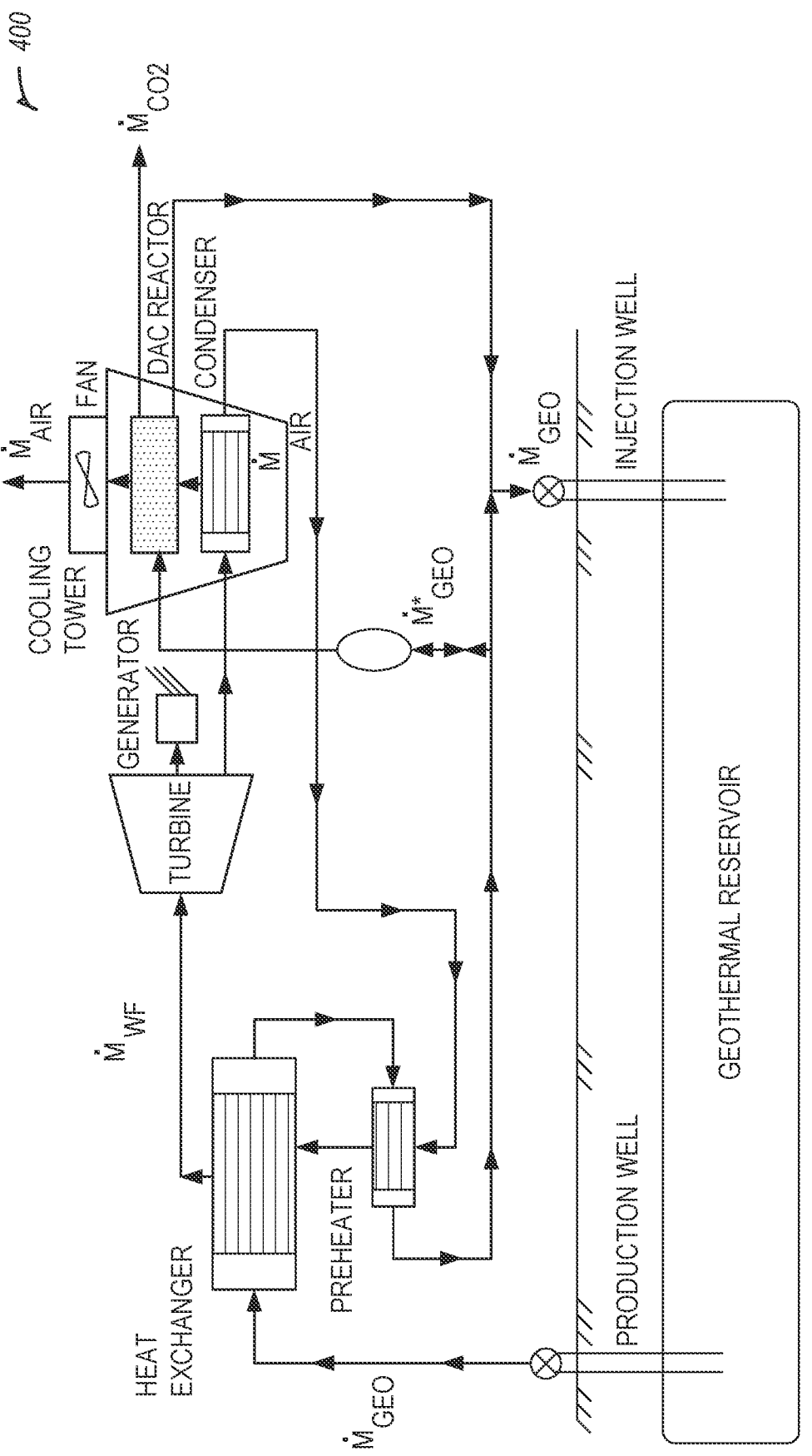
FIG. 4 illustrates a power plant system with an integrated DAC system n accordance with some examples.

FIG. 3 illustrates a condenser and DAC system 300 in accordance with some examples. FIG. 4 illustrates a power plant system 400 with an integrated DAC in accordance with some examples.

Geothermal air-cooled and hybrid condensers and DAC air contact arrays are uniquely well-situated to work together. First, they share a common design element: both systems require high-volume atmospheric intake to drive efficient processes. For geothermal condensers, air intake serves as a heat rejection mechanism during the stage of a plant's thermodynamic cycle where the working fluid (typically a refrigerant or organic compound) is condensed. For DAC, air intake conveys CO2 directly across the separation medium selected to scrub CO2 molecules from the atmosphere. Second, large industrial fan banks are often selected as the mechanism of choice for driving this high-volume atmospheric intake. The fan banks used in each industry have historically been designed completely independently of one another. Third, air-cooled and hybrid condensers and air intake arrays typically comprise a large portion of the capital expenditures associated with their respective facilities. Fourth, air-cooled and hybrid condensers and air contact arrays both have a steady energy requirement. Electricity is required to run condensers, and this electric load is factored into the parasitic load of a planned geothermal plant. For air contact arrays, roughly 80% of a total required energy must derive from thermal energy and 20% must derive from electricity. Thermal energy and electrical energy are both outputs of geothermal power plants, and a geothermal plant may provide both types of energy to a DAC facility directly. While CO2 captured during the DAC process may be sold for reuse in food processing, synthetic fuel production, or other industrial processes, it may also be permanently stored in geological formations, whereby negative emissions are achieved. Thus, co-locating DAC and geothermal facilities could provide benefits for long term CO2 storage.

Binary cycle geothermal power plants may use air, water, or both as a heat rejection medium during the working fluid condensation phase of the power cycle. When water supply near a planned geothermal power plant is limited, prudent facility design incorporates condensers that use ambient air or ambient air with limited water as the cooling medium. Typical air-cooled and hybrid condensers utilize a plurality of fans capable of passing a large volume of air over the working fluid circulating through condenser coils above or below the fans. The size of a plant's condensers is driven by the mass flow rate required to dissipate the necessary amount of waste heat from the working fluid before recirculating it back through the system. Since the heat transfer coefficient of ambient air is low, the number of fans required to move sufficient air is substantial, and the size and number of condensers typically dominates the layout area for binary plants equipped with air-cooled or hybrid cooling systems.

The DAC process commences when air is drawn in through an air contact array. Air contact arrays on the market today have been modeled off of cooling towers for other industrial processes. Air contact arrays drive a high volume of air across a filter that separates CO2 compounds from the air in order to produce a more concentrated stream that may then be used or stored. Two example mechanisms to perform this function include liquid solvents and solid sorbents.

Other available mechanisms include other absorption processes, cryogenic extraction, humidity and temperature swing processes, and numerous other developing approaches. Since CO2 concentration in the atmosphere today is relatively low at roughly 400 ppm, these fan banks may need to be sizeable if any meaningful amount of CO2 is to be separated from the air. Thus, the number of fans required to move sufficient air in DAC processes may also be substantial, and the size and number of fans required for effective air contact arrays may also dominate the layout area of a DAC facility.

Not only do the cooling tower condensers make up the largest portion of the geothermal facility footprint, but they may also account for the second largest associate capital expenditure required to construct the facility, behind only the Organic Rankine Cycle turbine that is used to generate electricity. Condensers may account for up to 30% of overall facility capital expenditure. Additionally, there is an economic tradeoff to be considered when designing a plant's condensers: a larger condenser will provide more effective cooling and increased plant electrical output, but it will also lead to a higher equipment cost and increased auxiliary power requirement.

Similarly, air contact arrays may make up the largest portion of a DAC facility's footprint and have high associated capital expenditures. According to open source technoeconomic assessment tools, air contact arrays for DAC facilities may account for roughly 33% of total equipment cost. Economically feasible capture systems must be sizeable enough to intake a high volume of air with as low of a pressure drop as possible, minimizing the cost associated with powering these systems.

Currently available air contact arrays all require roughly 80% thermal energy and 20% electricity for operation. The thermal energy demand results from desorption or ejection of previously bound CO2 compounds extracted from the air by the filter. The electricity requirement typically results from operating requirements of the contact arrays and other mechanisms involved in the desorption or CO2 ejection process. The electrical energy required may derive from the electricity generated by the geothermal power plants. Additionally, as a result of the geothermal cycle, the geothermal brine carries a substantial amount of thermal energy to the surface. While this thermal energy is what drives the electricity generation process, a portion of it may be siphoned to provide the thermal energy required to effectively operate DAC units located on site.

The systems and techniques described herein provide a combination of the mechanism utilized by air-cooled or hybrid condensers and air contact arrays into one functioning unit. In an example, a single bank of large fans may be utilized both to reject heat from a geothermal working fluid and to capture CO2 from the air. In this example, the mechanism for separating CO2 from the air utilizes either liquid solvent or solid sorbent mechanisms. In another example, the mechanism for separating CO2 is cryogenic extraction, anionic exchange, or an alternative. In an example, electrical and thermal energy derived from the geothermal plant itself are used either to power the fans or to purge CO2 from the CO2 separation medium, or both. In an example, the concentrated CO2 stream may be injected directly into the geothermal reservoir, where it may be mineralized and thus permanently stored. In another example, the concentrated CO2 may be sold or repurposed in other industrial processes.

FIG. 5 illustrates a flowchart showing a technique 500 for incorporating direct air carbon capture capabilities into a working fluid condensing process of a geothermal power plant in accordance with some examples. The geothermal power plant may be a binary cycle geothermal power plant.

The technique 500 includes an operation 502 to cause, using fans, air to flow across condenser coils of a condensing unit, through which power cycle working fluid is circulated. The condenser coils may include air-cooled or water-cooled condensers, such as entirely air-cooled, hybrid-cooled, or deluge condensers.

The technique 500 includes an operation 504 to cause, using the fans, the air to flow through a DAC filtration component, which separates carbon from the air. In an example, a solid sorbent method is used to separate CO2 from the air. In an example, a cryogenic extraction is used to separate CO2 from the air. In another example, anionic exchange resins are used to separate CO2 from the air.

The technique 500 includes an optional operation 506 to capture heat from the geothermal working fluid. The technique 500 includes an optional operation 508 to use the heat as thermal energy input to the DAC filtration component. The technique 500 includes an optional operation 510 to use electrical energy generated from the geothermal power plant as electrical energy input to power the condensing unit and the DAC filtration component.

The technique 500 includes an optional operation 512 to gather the carbon separated from the air to be injected into a geothermal reservoir or repurposed for another industrial process. The gathered carbon may include CO2 captured using the DAC filtration component, CO2 removed from production stream associated with the geothermal working fluid, or a combination. The gathered carbon may be used in an industrial process.

In an example, the gathered carbon may be injected and permanently stored in a geologic formation. The geologic formation may include a saline aquifer, a basaltic formation, a mafic formation, an ultramafic formation, or the like. In this example, the gathered CO2 may be permanently fixed in the geologic formation using various techniques, such as due to a multiphase flow trapping mechanism, by reacting with minerals and fluids in the geological formation to form solid minerals (e.g., carbonates), or the like.

In various examples, the DAC filtration component may use a liquid solvent or a solid sorbent to separate CO2 from the air. In the liquid solvent example, a component required to purge CO2 from the liquid solvent may be heated solely with energy derived from the geothermal power plant. In the solid sorbent example, when the air is shut off to allow for desorption of CO2 from the solid sorbent, the air may be only shut off from or bypassed around the DAC filtration component, while the air continues to reject heat from the geothermal working fluid. In the solid sorbent example, thermal energy required to heat the solid sorbent to a regeneration temperature of approximately 80-120 deg Celsius may be generated by the geothermal working fluid. In the solid sorbent example, inert fluid required to purge CO2 from the solid sorbent may include steam generated by flashing the geothermal working fluid.

In view of the disclosure above, various examples are set forth below. It should be noted that one or more features of an example, taken in isolation or combination, should be considered within the disclosure of this application.

Example 1 is a method for incorporating direct air carbon dioxide capture capabilities into a working fluid condensing process of a geothermal power plant, the method comprising: causing, using fans, air to flow across condenser coils of a condensing unit, through which power cycle working fluid is circulated, and through a direct air capture (DAC) filtration component, which separates carbon from the air; capturing heat from a geothermal working fluid; using the heat as thermal energy input to the DAC filtration component; using electrical energy generated from the geothermal power plant as electrical energy input to power the condensing unit and the DAC filtration component; and gathering the carbon separated from the air to be injected into a geothermal reservoir or repurposed for another industrial process.

In Example 2, the subject matter of Example 1 includes, wherein the condenser coils are entirely air-cooled condensers.

In Example 3, the subject matter of Examples 1-2 includes, wherein the condenser coils are hybrid air- and water-cooled, or deluge, condensers.

In Example 4, the subject matter of Examples 1-3 includes, wherein the gathered carbon is a combination of CO2 captured using the DAC filtration component and CO2 removed from production stream associated with the geothermal working fluid.

In Example 5, the subject matter of Examples 1-4 includes, wherein the DAC filtration component uses a liquid solvent to separate CO2 from the air.

In Example 6, the subject matter of Example 5 includes, wherein a component required to purge CO2 from the liquid solvent is heated solely with energy derived from the geothermal power plant.

In Example 7, the subject matter of Examples 1-6 includes, wherein the DAC filtration component uses a solid sorbent to separate CO2 from the air.

In Example 8, the subject matter of Example 7 includes, wherein, when the air is shut oft to allow for desorption of CO2 from the solid sorbent, the air is only shut off from or bypassed around the DAC filtration component and wherein the air continues to reject heat from the geothermal working fluid.

In Example 9, the subject matter of Examples 7-8 includes, wherein thermal energy required to heat the solid sorbent to a regeneration temperature of approximately 80-120 deg Celsius is generated by the geothermal working fluid.

In Example 10, the subject matter of Examples 7-9 includes, wherein inert fluid required to purge CO2 from the solid sorbent includes steam generated by flashing the geothermal working fluid.

In Example 11, the subject matter of Examples 1-10 includes, wherein a cryogenic extraction is used to separate CO2 from the air.

In Example 12, the subject matter of Examples 1-11 includes, wherein anionic exchange resins are used to separate CO2 from the air.

In Example 13, the subject matter of Examples 1-12 includes, wherein captured CO2 is used in the another industrial process, including at least one of food processing or synthetic fuel production.

In Example 14, the subject matter of Examples 1-13 includes, wherein captured CO2 is injected and permanently stored in a geologic formation.

In Example 15, the subject matter of Example 14 includes, wherein the geologic formation is a saline aquifer.

In Example 16, the subject matter of Examples 14-15 includes, wherein the geologic formation is a basaltic formation.

In Example 17, the subject matter of Examples 14-16 includes, wherein the geologic formation is a mafic or ultramafic formation.

In Example 18, the subject matter of Examples 14-17 includes, wherein the captured CO2 is permanently fixed in the geologic formation due to a multiphase flow trapping mechanism.

In Example 19, the subject matter of Examples 14-18 includes, wherein the captured CO2 is permanently fixed in the geologic formation by reacting with minerals and fluids in the geologic formation to form solid minerals.

In Example 20, the subject matter of Example 19 includes, wherein the solid minerals include carbonates.

In Example 21, the subject matter of Examples 1-20 includes, wherein the geothermal power plant is a binary cycle geothermal power plant.

Example 22 is a system to incorporate direct air carbon dioxide capture capabilities into a working fluid condensing process of a binary cycle geothermal power plant, the system comprising: a condensing unit including a set of condenser coils, the condensing unit to circulate a power cycle working fluid and reject heat from the power cycle working fluid, the condensing unit cooled by air; and a direct air carbon (PAC) filter system to use the captured heat and electrical energy generated by the binary cycle geothermal power plant to filter carbon dioxide from the air; and a plurality of fans to direct the air through the condensing unit and the DAC filter system.

In Example 23, the subject matter of Example 22 includes, wherein the plurality of fans maintain a sufficient air flow of the air to cool the condensing unit and operate the DAC filter system.

Example 24 is a system to incorporate direct air carbon (DAC) capture capabilities into a working fluid condensing process of a binary cycle geothermal power plant, the system comprising: a condensing unit including a set of condenser coils, a plurality of fans, and a DAC filter system, wherein the plurality of fans cause air to flow through the condensing unit and the DAC filter system.

Example 25 is a method for incorporating direct air carbon capture capabilities into a working fluid condensing process of a geothermal power plant, the method comprising: causing, using fans, air to flow across condenser coils of a condensing unit, through which a power cycle working fluid is circulated; causing, using the fans, the air to flow through a DAC filtration component, which separates carbon from the air; optionally capturing heat from a geothermal working fluid; optionally using the heat as thermal energy input to the DAC filtration component; optionally using electrical energy generated from the geothermal power plant as electrical energy input to power the condensing unit and the DAC filtration component; and optionally gathering the carbon separated from the air to be injected into a geothermal reservoir or repurposed for another industrial process.

In Example 26, the subject matter of Examples 1-25 includes, wherein a size of a cooling tower condenser is designed to match air flow rate requirements for efficient heat rejection of the power facility.

In Example 27, the subject matter of Example 26 includes, wherein the size, structure, or materials of the air contact array may be designed based on the required air flow rate of the power facility, temperature of the ambient air entering the air contact array, or reaction rate kinetics of the carbon capture material.

In Example 28, the subject matter of Examples 1-27 includes, wherein heat captured from the geothermal working fluid is a relatively high-grade heat (e.g., prior to sending the geothermal fluid through the heat exchanger).

In Example 29, the subject matter of Examples 1-28 includes, wherein heat captured from the geothermal working fluid is a relatively low-grade heat (e.g., after sending the geothermal fluid through the heat exchanger).

Example 30 is at least one machine-readable medium including instructions that, when executed by processing circuitry, cause the processing circuitry to perform operations to implement of any of Examples 1-29.

Example 31 is an apparatus comprising means to implement of any of Examples 1-29.

Example 32 is a system to implement of any of Examples 1-29,

Example 33 is a method to implement of any of Examples 1-29.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

What is claimed is:

1. A method for incorporating direct air carbon dioxide capture capabilities into a working fluid condensing process of a geothermal power plant, the method comprising:
  causing, using fans, air to flow across condenser coils of a condensing unit, through which power cycle working fluid is circulated, and through a direct air capture (DAC) filtration component, which separates carbon from the air;
  capturing heat from a geothermal working fluid using a heat exchanger coupled to the condensing unit, the heat exchanger transferring the heat from the geothermal working fluid to the power cycle working fluid;
  using the heat as thermal energy input to the DAC filtration component and the condensing unit, the condensing unit transferring the heat from the power cycle working fluid to the air;
  using electrical energy generated from the geothermal power plant as electrical energy input to power the condensing unit and the DAC filtration component; and
  gathering the carbon separated from the air to be injected into a geothermal reservoir or repurposed for an industrial process.

2. The method of claim 1, wherein the condenser coils are entirely air-cooled condensers.

3. The method of claim 1, wherein the condenser coils are hybrid air- and water-cooled, or deluge, condensers.

4. The method of claim 1, wherein the gathered carbon is a combination of CO2 captured using the DAC filtration component and CO2 removed from production stream associated with the geothermal working fluid.

5. The method of claim 1, wherein the DAC filtration component uses a liquid solvent to separate CO2 from the air.

6. The method of claim 5, wherein a component required to purge CO2 from the liquid solvent is heated solely with energy derived from the geothermal power plant.

7. The method of claim 1, wherein the DAC filtration component uses a solid sorbent to separate CO2 from the air.

8. The method of claim 7, wherein, when the air is shut off to allow for desorption of CO2 from the solid sorbent, the air is only shut off from or bypassed around the DAC filtration component and wherein the air continues to reject heat from the geothermal working fluid.

9. The method of claim 7, wherein thermal energy required to heat the solid sorbent to a regeneration temperature of approximately 80-120 deg Celsius is generated by the geothermal working fluid.

10. The method of claim 7, wherein inert fluid required to purge CO2 from the solid sorbent includes steam generated by flashing the geothermal working fluid.

11. The method of claim 1, wherein CO2 is separated from the air using a cryogenic extraction or anionic exchange resins.

12. The method of claim 1, wherein captured CO2 is used in the industrial process, including at least one of food processing or synthetic fuel production.

13. The method of claim 1, wherein captured CO2 is injected and permanently stored in a geologic formation.

14. The method of claim 13, wherein the geologic formation is a saline aquifer, a basaltic formation, or a mafic or ultramafic formation.

15. The method of claim 1, wherein the geothermal power plant is a binary cycle geothermal power plant.

16. A system to incorporate direct air carbon dioxide capture capabilities into a working fluid condensing process of a binary cycle geothermal power plant, the system comprising:
  a heat exchanger to transfer heat from a geothermal working fluid to a power cycle working fluid;
  a condensing unit including a set of condenser coils, the condensing unit coupled to the heat exchanger, the condensing unit to circulate the power cycle working fluid and reject the heat from the power cycle working fluid, the condensing unit cooled by air;
  a direct air carbon (DAC) filter system to use the heat from the geothermal working fluid and electrical energy generated by the binary cycle geothermal power plant to filter carbon dioxide from the air; and
  a plurality of fans to direct the air through the condensing unit and the DAC filter system.

17. The system of claim 16, wherein the plurality of fans maintain a sufficient air flow of the air to cool the condensing unit and operate the DAC filter system.

18. A system to incorporate direct air carbon (DAC) capture capabilities into a working fluid condensing process of a binary cycle geothermal power plant, the system comprising:
  a condensing unit including a set of condenser coils, a heat exchanger coupled to the condensing unit, a plurality of fans, and a DAC filter system, wherein the plurality of fans cause air to flow through the condensing unit and the DAC filter system, the heat exchanger transfers heat from a geothermal working fluid to a power cycle working fluid, and the condensing unit transfers the heat from the power cycle working fluid to air.

19. A method for incorporating direct air carbon capture capabilities into a working fluid condensing process of a geothermal power plant, the method comprising:
  causing, using fans, air to flow across condenser coils of a condensing unit, through which a power cycle working fluid is circulated;
  causing, using the fans, the air to flow through a DAC filtration component, which separates carbon from the air;
  capturing heat from a geothermal working fluid using a heat exchanger coupled to the condensing unit, the heat exchanger transferring the heat from the geothermal working fluid to the power cycle working fluid;
  using the heat as thermal energy input to the DAC filtration component and the condensing unit, the condensing unit transferring the heat from the power cycle working fluid to the air;
  using electrical energy generated from the geothermal power plant as electrical energy input to power the condensing unit and the DAC filtration component; and
  gathering the carbon separated from the air to be injected into a geothermal reservoir or repurposed for another industrial process.

20. The method of claim 19, wherein a size of a cooling tower condenser is designed to match air flow rate requirements for efficient heat rejection of the geothermal power plant.

* * * * *